Oct. 12, 1948.                    F. M. THOMAS                    2,451,416
                              INTERMITTENT DRIVE DEVICE
Filed July 6, 1946                                              2 Sheets-Sheet 1
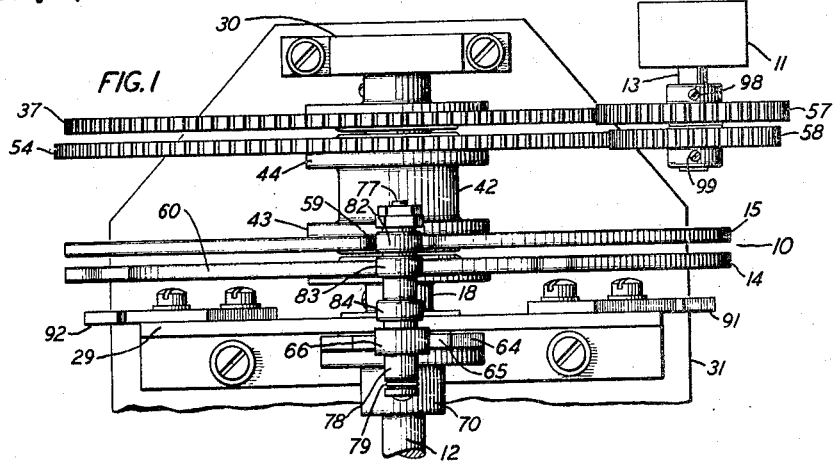
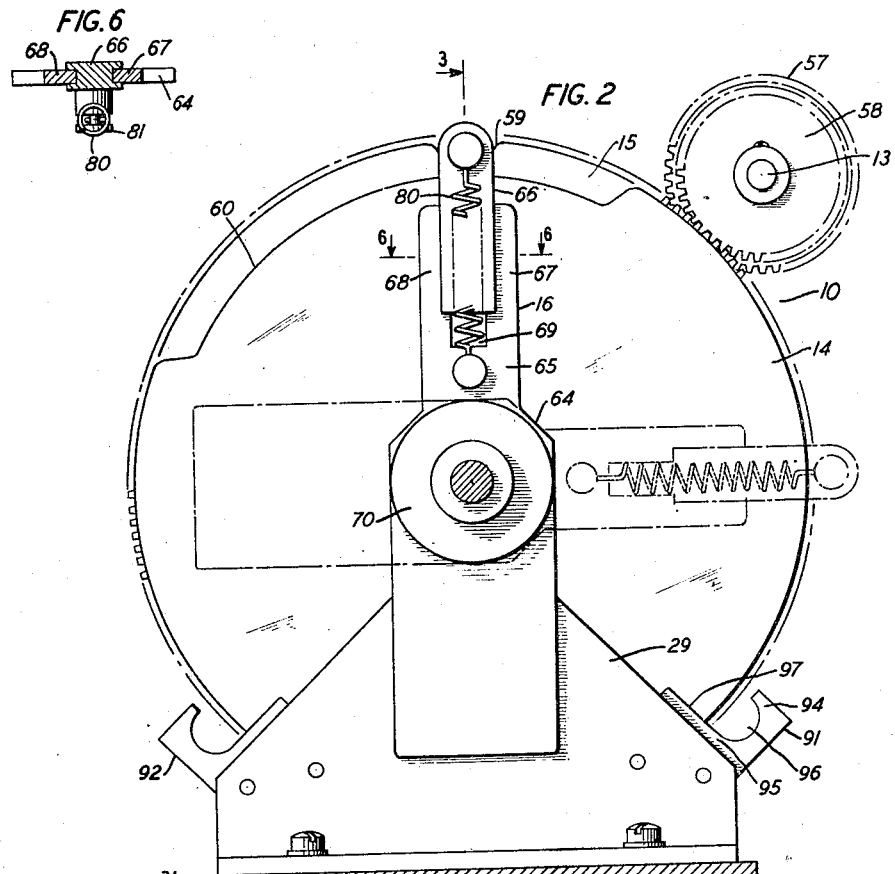
INVENTOR
F. M. THOMAS
BY J. MacDonald
ATTORNEY Oct. 12, 1948.    F. M. THOMAS    2,451,416
INTERMITTENT DRIVE DEVICE
Filed July 6, 1946    2 Sheets—Sheet 2
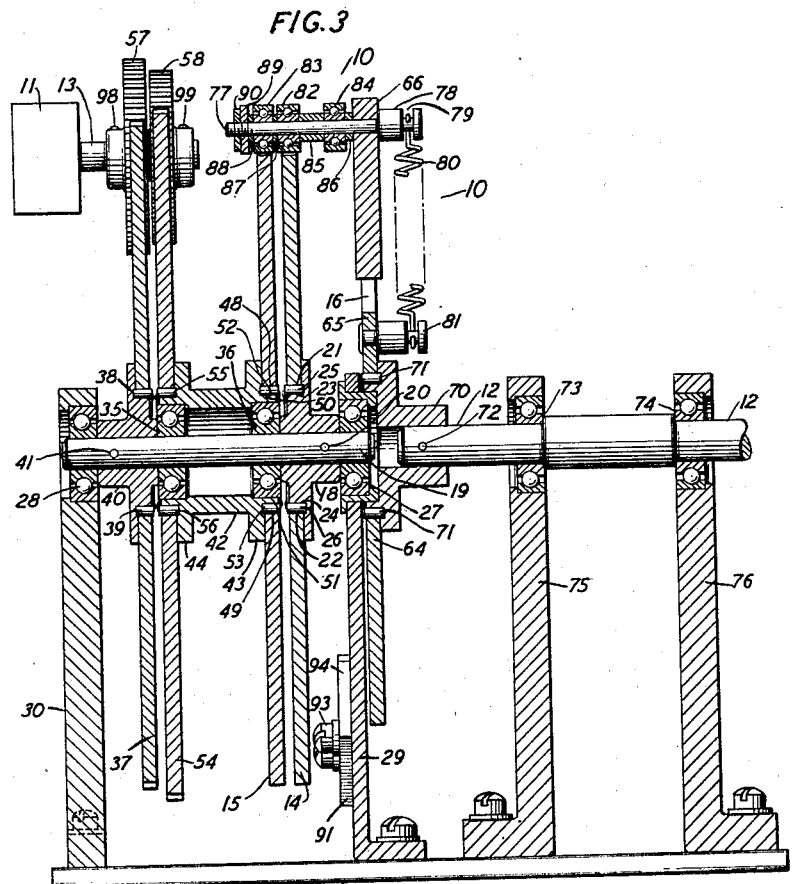
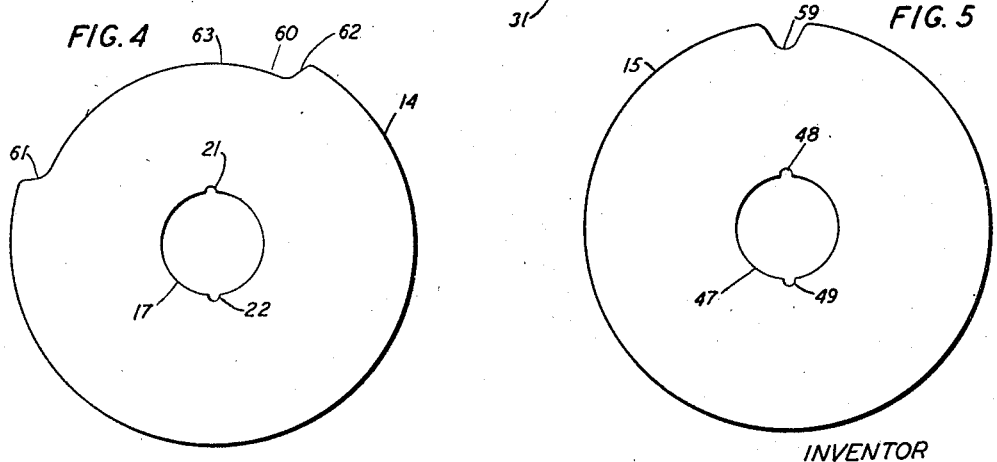
INVENTOR
F. M. THOMAS
BY J. MacDonald
ATTORNEY Patented Oct. 12, 1948

2,451,416

UNITED STATES PATENT OFFICE 2,451,416

INTERMITTENT DRIVE DEVICE

Frank M. Thomas, Summit, N. J., assignor to Bell Telephone Laboratories, Incorporated, New York, N. Y., a corporation of New York Application July 6, 1946, Serial No. 681,653

8 Claims. (Cl. 74—125.5)

1

This invention relates to mechanical drive devices and more particularly to mechanical drive devices operable to transmit driving movements from driving means to means required to be driven intermittently.

An object of the invention is to provide improved mechanical means for transmitting driving movements of a rotatable driving means to a rotatable member required to be rotated intermittently.

A feature of the invention resides in a plurality of wheels driven at relatively different speeds and operable to intermittently move an arm.

Another feature resides in the arm above mentioned.

Another feature resides in stop means provided in the device.

In the drawings:

Fig. 1 is a plan view of the mechanical drive device embodying the invention;

Fig. 2 is an end view, in elevation, of the mechanical drive device;

Fig. 3 is a side view, in section, of the mechanical drive device taken on the line 3—3 in Fig. 2;

Fig. 4 is a plan view of one of the wheels;

Fig. 5 is a plan view of another of the wheels; and

Fig. 6 is a view, partly in section, of a portion of the arm.

The mechanical drive device 10 as shown in Figs. 1 and 3 may form a means for transmitting driving movements of a motor device 11 or other prime mover to a shaft 12 required to be intermittently driven. The motor device 11 or other prime mover employed is operable to rotate in a plurality of directions. The shaft 12 should be connected to a rotatable part of a device, not shown, but, required to be intermittently operated during the rotation of the shaft 13.

In the mechanical drive device 10 shown in the drawings two wheels 14 and 15 are provided to control the operation of an arm 16 which is in mechanical connection with the shaft 12. The wheels 14 and 15 are driven at relatively different speeds, the wheel 14 being driven at a faster speed than the wheel 15.

The wheel 14 as shown in Fig. 4 is centrally apertured at 17 to receive a hub 18 which is mounted on a rotatable shaft 19, the hub 18 being secured to the shaft 19 by means of a pin 20 or other suitable means. Keyways 21 and 22 are formed in the wheel 14, the keyways 21 and 22 opening into the aperture 17 provided in the wheel 14. Corresponding keyways 23 and 24 are formed in the hub 18 to register with the respective keyways 21 and 22 formed in the wheel 14. The keyways 21 and 23 cooperate to form an opening to receive a key 25 and the keyways 22 and 24 cooperate to form an opening to receive a key 26, the keys 25 and 26 being inserted in the openings provided therefor and secured in place in any suitable manner. End portions of the hub, for instance, may be spun over or staked over the key and wheel. It will be seen that the keys 25 and 26 engage portions of the wheel 14 and portions of the hub 18 and prevent relative rotation of the wheel 14 and the hub 18.

The shaft 19 is supported in low friction type bearings 27 and 28 supported in spaced supports 29 and 30, respectively, extending from and mounted on a base 31. A driving wheel 37 is provided to rotate the shaft 19, the driving wheel 37 being keyed by means of keys 38 and 39 to a hub 40 supported on the shaft 19 and the hub 40 being secured to the shaft 19 by means of a pin 41 or other suitable means. When the driving wheel 37 is rotated the shaft 19 and the wheel 14 are rotated at the same speed as the driving wheel 37.

The wheel 15 is in spaced face to face relation with the wheel 14 and is mounted in a tubular support 42 provided with spaced flanges 43 and 44. The tubular support 42 is constructed to accommodate the shaft 19 and is supported on the low friction type bearings 35 and 36, which are supported on the shaft 19. The wheel 15 as shown in Fig. 5 is provided with a central aperture 47 to receive an end of the tubular support 42. Keyways 48 and 49 are formed in the wheel 15, the keyways 48 and 49 opening into the aperture 47. Corresponding keyways 50 and 51 are formed in the tubular support 42 to register with the respective keyways 48 and 49 formed in the wheel 15. The keyways 48 and 50 cooperate to form an opening to receive a key 52 and the keyways 49 and 51 cooperate to form an opening to receive a key 53, the keys 52 and 53 being inserted in the openings provided therefor and secured in place in any suitable manner. It will be seen that the keys 52 and 53 engage portions of the wheel 15 and portions of the tubular support 42 and prevent relative rotation of the wheel 15 and the tubular support 42. A driving wheel 54 is provided to rotate the tubular support 42, the driving wheel 54 being keyed by means of keys 55 and 56 to the tubular support 42. The driving wheel 54 is rotated at a slower speed than the driving wheel 37 and when the driving wheel 54 is rotated the wheel 15 is rotated at the same speed as the driving wheel 54.

The means provided for rotating the driving wheels 37 and 54 may be any positive type of driving means found suitable for the purpose. A workable structure and arrangement, however, is shown in Figs. 1 and 3. In the structure and arrangement chosen as an illustration of the invention and not in the sense of a limitation thereof the driving wheels 37 and 54 are gear wheels in mesh with gears 57 and 58, respectively, secured to the rotatable shaft 13 of the motor device 11. The gear 57 is larger in diameter than the gear 58 and is in driving engagement with the driving wheel 37 which is smaller in diameter than the driving wheel 54 in driving engagement with the gear 58. When the shaft 13 is rotated the driving wheels 37 and 54 are rotated at relatively different speeds and the wheels 14 and 15 are rotated at relatively different speeds, the wheel 14 rotating faster than the wheel 15.

The wheels 14 and 15 are equal in outside diameter and are arranged in spaced parallel face to face relation. A substantially V-shaped notch 59 is formed in the outer edge of the wheel 15 and a relatively long notch 60 is formed in the outer edge of the wheel 14. The notches 59 and 60 are of about the same depth and when the wheels 14 and 15 are rotated at relatively different speeds the notches 59 and 60 will be brought into register with one another at some time during the rotations of the wheels 14 and 15. The ends 61 and 62 of the notch 60 slope outwardly from the base portion 63 to the main outer edge of the wheel 14.

The arm 16 as shown in Fig. 2 comprises an apertured body portion 64 part of which is reduced in width to provide a relatively lightweight arm portion 65 which is constructed to provide a support for a slide bar 66. The arm portion 65 is bifurcated to provide spaced fingers 67 and 68 and a longitudinal opening 69. The long sides of the slide bar 66 are channeled to receive the inner edges of the fingers 67 and 68, as shown in Fig. 6, the slide bar 66 being arranged to slide lengthwise of the fingers 67 and 68 and in the longitudinal opening 69. The body portion 64 of the arm 16 is mounted on a flanged collar 70 and is keyed thereto by means of pins 71—71. The collar 70 is secured to the shaft 12 by a pin 72 or other suitable securing means. The shaft 12 is supported in low friction type bearings 73 and 74 mounted in spaced brackets 75 and 76 secured to and extending upwardly from the base 31.

The slide bar 66 provides a movable support for a rod 77 which is mounted in the upper end of the slide bar 66 and extends at a 90-degree angle from the plane of the slide bar 66 and transversely over the outer edges of the wheels 14 and 15. One end of the rod 77 is formed to provide a head portion 78 which bears against the outer face of the slide bar 66, the shank of the rod 77 extending through an aperture formed in the upper portion of the slide bar 66. The head portion 78 of the rod 77 is annularly grooved at 79 to receive one end of a helical spring 80 which is anchored to the head portion 78, the other end of the spring 80 being anchored to a stud 81 mounted on and extending angularly from the arm portion 65 of the arm 16.

Supported on the shank portion of the rod 77 are ball bearing equipped rollers 82, 83 and 84 which are held in spaced relation on the rod 77 by means of spacers 85, 86, 87 and 88, the rollers and spacers being stacked on the rod 77 and held against movement off the rod 77 by means of a nut 89 and a locknut 90 in threaded engagement with a screw thread formed on the rod 77. The roller 82 is positioned to ride on the outer edge of the wheel 14 and the roller 83 is positioned to ride on the outer edge of the wheel 15. The rollers 82 and 83 are maintained in engagement with the wheels 14 and 15, respectively, by the action of the spring 80 which constantly urges the slide bar 66 toward the axial line of the shafts 19 and 12.

When the wheels 14 and 15 are rotating at relatively different speeds and the notches 59 and 60 come into register with each other the rod 77 moves toward the central portions of the wheels 14 and 15 under the action of the spring 80 and the rollers 82 and 83 settle into the notches 60 and 59, respectively, in the wheels 14 and 15. When the roller 83 moves into the V notch 59 in the wheel 15 and the wheel 15 is rotating the arm 16 is carried around by the wheel 15 and operates as a crank to cause rotation of the shaft 12. The shaft 12 is therefore rotated when the notches 59 and 60 are in register and the wheel 15 is rotating.

Since the wheel 14 rotates faster than the wheel 15 the notch 60, in effect, outruns the notch 59 and passes beyond a point of register with the notch 59. When the notch 60 is passing out of register with the V notch 59 the wheel 14 acts as a cam to move the rollers 82 and 83 outwardly of the wheels 14 and 15, respectively, and against the action of the spring 80. The arm 16 then ceases to be driven by the wheel 15 and the rollers 82 and 83 simply ride on the outer edges of the wheels 14 and 15, respectively, until the notches 59 and 60 again come into register. The length of time the arm 16 and the shaft 12 are rotated depends mainly on the length of the notch 60 and the relative speeds of rotation of the wheels 14 and 15.

Stop means comprising stop plates 91 and 92 and the roller 84 are provided for limiting rotation of the shaft 12. The stop plates 91 and 92 are mounted on the support 29 and are positioned in the line of travel of the roller 84 and so that the arm 16 cannot be rotated a full 360 degrees in a clockwise or counterclockwise direction. The stop plates 91 and 92 which are secured to the support 29 by means of screws 93 or other suitable securing means are formed in each case to provide a hook portion 94 extending from a body portion 95 which extends in the line of travel of the roller 84. The outer end of the hook portion 94 does not extend into the line of travel of the roller 84 when the rollers 82 and 83 are in the notches 60 and 59, respectively. The body portion 95 serves as a stop which is engaged by the roller 84 to stop rotation of the arm 16. The hook portion 94 in cooperation with the body portion 95 forms a recess 96 into which the roller 84 may pass when the roller 84 strikes the forward edge 97 of the body portion 95 and the wheels 14 and 15 continue to turn. When the roller 84 strikes the forward edge 97 of the body portion 95 and the wheels 14 and 15 continue to turn the wheels 14 and 15 act as cams against the rollers 82 and 83 to move the slide bar 66 outwardly against the action of the spring 80. Under this condition the wheels 14 and 15 may turn without turning the arm 16 and the roller 84 is brought into engagement with the hook portion 94 which serves to prevent swinging back of the arm 16. It will be seen that the stop plates 91 and 92 serve as stops for the arm 16 and that by virtue of the hook portion 94 provided on each stop the stop plates 91 and 92 function in the nature of keepers of a latch, the cooperating portion of which is the roller 84.

When the arm 16 has been driven in one direction and has been stopped by one of the stops 91 and 92 and is being held against return movement by engagement of the hook portion 94 with the roller 84 the arm 16 may be released from this condition by rotating the wheels 14 and 15 in a direction reverse from their former operation until the notches 59 and 60 come into register with each other. The spring 80 then pulls the slide bar 66, the rod 77 and the rollers 82, 83 and 84 toward the axial line of the shaft 19 and brings the rollers 82 and 83 into the notches 60 and 59 and the roller 84 out of the hook portion 94. Upon further rotation of the wheels 14 and 15 in the required direction the arm 16 is driven away from the stop.

The relative speeds of the wheels 14 and 15, the length of the notch 60 in the wheel 14 and the locations of the stop plates 91 and 92 may be such that the notches in the wheels 14 and 15 will only be in register while the notch 59 is travelling in a counter-clockwise direction from the stop plate 91 to the stop plate 92 or is travelling in a clockwise direction from the stop plate 92 to the stop plate 91. If the length of the notch 60 in the wheel 14 and the distance between the stop plates 91 and 92 are of the order shown in Fig. 2 and the wheels 14 and 15 are driven so that the wheel 14 makes one complete cyclic rotation for three quarters of a cyclic rotation of the wheel 15 in the same direction and the initial relative positions of the notches in the wheels are such that the notch 60 in the wheel 14 begins to register with the V notch 59 in the wheel 15 when the V notch 59 is at the position of the stop plate 91 and the wheels 14 and 15 are driven counter-clockwise the notch 60 in the wheel 14 will pass out of register with the V notch 59 in the wheel 15 just as the arm 16 brings the roller 84 into engagement with the stop plate 92. In a reverse movement the notch 60 will pass out of register with the V notch 59 when the roller 84 comes into engagement with the stop plate 91. The wheels 14 and 15 may be adjusted to required initial positions by loosening the set screws 98 and 99 on the gears 57 and 58 respectively and turning the gears 57 and 58 and the wheels 14 and 15 as required.

The wheels 14 and 15 can be so relatively adjusted and set that when the notch 59 in wheel 15 is in register with the stop 91 the right-hand end of the notch 60 in wheel 14, as viewed in Fig. 2, will be almost in register with the notch 59 in wheel 15 and upon sufficient counter-clockwise movements of the wheels 14 and 15 at their relatively different speeds the notch 60 will pass out of register with the notch 59 when the arm 16 is in about the position shown in dot-dash lines in Fig. 2. In this case the rod 77 on the slide bar 66 will be moved out of the notch 59 by means of the wheel 14 and the arm 16 will not be driven further until the notches 59 and 60 come into register again and in register with the rod 77. With the wheels 14 and 15 continuously driven in a counter-clockwise direction the notches 59 and 60 will again come around to the dot-dash line position of the arm 16. However, on the first full turn of the wheel 15 the notch 60 in the wheel 14 will already have passed beyond the notch 59 in the wheel 15 when the notch 59 comes into register with the arm 16. The rod 77 of the arm 16 at this time will be prevented from coming into the notch 59 of the wheel 15 by the wheel 14 and the arm 16 will not be moved. On the next full turn of the wheel 15 in the same direction, the notches 59 and 60 will not be in register when the notch 59 reaches the position of the arm 16 and the arm 16 will again be not driven. On the next full turn of the wheel 15 the notch 60 in the wheel 14 will be in register with the notch 59 in wheel 15 when the notch 59 arrives at the position of the arm 16 shown in dot-dash lines in Fig. 2, and the arm 16 will again be driven until the notch 60 in wheel 14 passes out of register with the notch 59 in wheel 15. However, if the relative initial setting of the wheels 14 and 15 is such that the arm 16 is still being driven when the arm 16 encounters the stop 92, the arm 16 will be stopped from further rotation in the counter-clockwise direction.

What is claimed is:

1. A drive device comprising a plurality of notched wheels driven at relatively different speeds, means for driving said wheels, a rotatable member and a connecting member extending from said rotatable member and into contact with said wheels and operable to engage in the notches in said wheels when the notches in said wheels are in register, said connecting member operating to transmit rotational movements of one of said wheels to said rotatable member when the notches in said wheels are in register with each other and with said connecting member.

2. A drive device comprising a plurality of notched wheels driven at relatively different speeds, means for driving said wheels, a rotatable member and an attachment secured on said rotatable member and extending into contact with said wheels and operable to engage in the notches in said wheels when the notches in said wheels are in register, one of said wheels being operable to drive said attachment when the notches in said wheels are in register, and said attachment extends into the notches in said wheels, another of said wheels being operable to move said attachment out of driving connection with the other of said wheels when the notches in said wheels move out of register with each other, said attachment operating to rotate said rotatable member when the notches in said wheels are in register with each other and with said attachment.

3. A drive device for operating a rotatable shaft comprising a plurality of notched wheels driven at relatively different speeds, means for driving said wheels, a rotatable shaft, an arm attached to said shaft and a member on said arm riding on said wheels and operable to engage in the notches in said wheels when the notches in said wheels come into register, said arm being operable to rotate said shaft while the notches in said wheels are in register and said member is in the notches in said wheels, one of said wheels being operable to drive said arm when said member is in the notch in that wheel and another of said wheels being operable to move said member out of the notch in the other of said wheels when the notches in said wheels pass out of register with each other.

4. A drive device for operating a rotatable shaft comprising a plurality of notched wheels driven at relatively different speeds, means for driving said wheels, a shaft, an arm attached to said shaft and a member on said arm extending into contact with said wheels and operable to move into the notches in said wheels when the notches come into register, said arm operating to transmit rotations of one of said wheels to said shaft only when said member is in the notches in said wheels.

5. A drive device for intermittently operating a rotatable shaft comprising a plurality of wheels each having a notch formed in an edge portion of the wheel, means for rotating said wheels at relatively different speeds, a shaft, an arm carried by said shaft and operable to turn said shaft, a member slidably supported on said arm and extending into contact with edge portions of said wheels, means to urge said member against edge portions of said wheels and into the notches in said wheels when the notches in said wheels come into register, one of said wheels being operable to drive said arm to turn said shaft when said member engages in the notches in said wheels and another of said wheels being operable to move said member out of driving engagement with one of said wheels when the notches in said wheels are going out of register.

6. An intermittently drive device comprising a plurality of wheels driven at relatively different speeds, means for driving said wheels, one of said wheels having a relatively narrow notch formed in its outer edge and another of said wheels having a relatively wide notch formed in its outer edge, said wheels being arranged in spaced face to face relation and the wheel having the wider notch being the faster operated wheel, a rotatable member, and a drive arm in mechanical connection with said rotatable member and extending across the edges of said wheels, said drive arm being operable to move into the notches in said wheels when the notches in said wheels are in register to establish a driving connection between the wheel with the smaller notch and said rotatable member and the wheel with the wider notch being operable to move said drive arm out of driving condition when the notches in said wheels pass out of register.

7. An intermittent drive device comprising a plurality of wheels driven at relatively different speeds, means for driving said wheels, one of said wheels having a relatively narrow notch formed in its outer edge and another of said wheels having a relatively wide notch arranged to pass into and out of register with the narrower notch in the first wheel, a rotatable member, an arm in mechanical connection with said rotatable member, a slidable member on said arm and a rod carried by said slidable member and extending across edge portions of said wheels and operable to engage in the notches in said wheels when the notches are in register, said arm operating to transmit rotations of the wheel having the narrower notch to said rotatable member when the notches are in register and the wheel having the wider notch operating to move said rod out of the narrower notch when the notches pass out of register.

8. An intermittent drive device comprising a notched wheel, a rotatable member, an arm mechanically connected to said rotatable member, a rod movably supported on said arm and engageable in the notch in said wheel, said arm being operable to transmit rotation of said wheel to said rotatable member when said rod is in the notch in said wheel, a second wheel operable to move said rod out of the notch in the first wheel, means to rotate said wheels at relatively different speeds and a stop in the line of travel of said rod and having a recessed portion to accommodate said rod when said rod is moved out of the notch in the first wheel.

FRANK M. THOMAS.

REFERENCES CITED

The following references are of record in the file of this patent:

UNITED STATES PATENTS

| Number | Name | Date |
| --- | --- | --- |
| 1,801,359 | Metcalfe | Apr. 21, 1931 |